United States Patent [19]

Kramer

[11] 4,154,000
[45] May 15, 1979

[54] REMOTE LEVEL SENSING INSTRUMENT

[75] Inventor: Melvin G. Kramer, Riverton, Wyo.

[73] Assignee: The Brunton Company, Riverton, Wyo.

[21] Appl. No.: 817,006

[22] Filed: Jul. 19, 1977

Related U.S. Application Data

[63] Continuation of Ser. No. 648,383, Jan. 12, 1976, abandoned.

[51] Int. Cl.² .............................................. G01C 9/06
[52] U.S. Cl. .................................................... 33/366
[58] Field of Search ............ 33/366; 250/231 R, 575, 250/577

[56] References Cited

U.S. PATENT DOCUMENTS

| | | | |
|---|---|---|---|
| 3,324,564 | 6/1967 | Wright et al. | 33/379 X |
| 3,371,424 | 3/1968 | Sweet | 33/366 |
| 3,813,556 | 5/1974 | Beer et al. | 250/231 R X |
| 3,822,944 | 7/1974 | Hopkins et al. | 33/366 X |

*Primary Examiner*—Charles E. Phillips
*Attorney, Agent, or Firm*—John E. Reilly

[57] ABSTRACT

Concentrated light beams from two or more sources are passed through a spirit level mounted in a portable housing and the presence of the light beam columns after passing through the level is detected to indicate on-level or the direction of off-level for a remote plane or surface. In one form, detection circuitry selectably lights one or a pair of indicator lamps appropriately arrayed on a display panel for establishing that the remote spirit level is in a level orientation or the direction of out-of-level. The detector circuitry can include cross-coupling to prevent an erroneous indication of the direction of out-of-level. In another form, multiple pairs of concentrated light sources and detectors are arrayed along the length of the spirit level and digital circuitry converts the detected outputs into a direct digital display and/or into a format appropriately useful for other digital data handling equipment.

13 Claims, 9 Drawing Figures

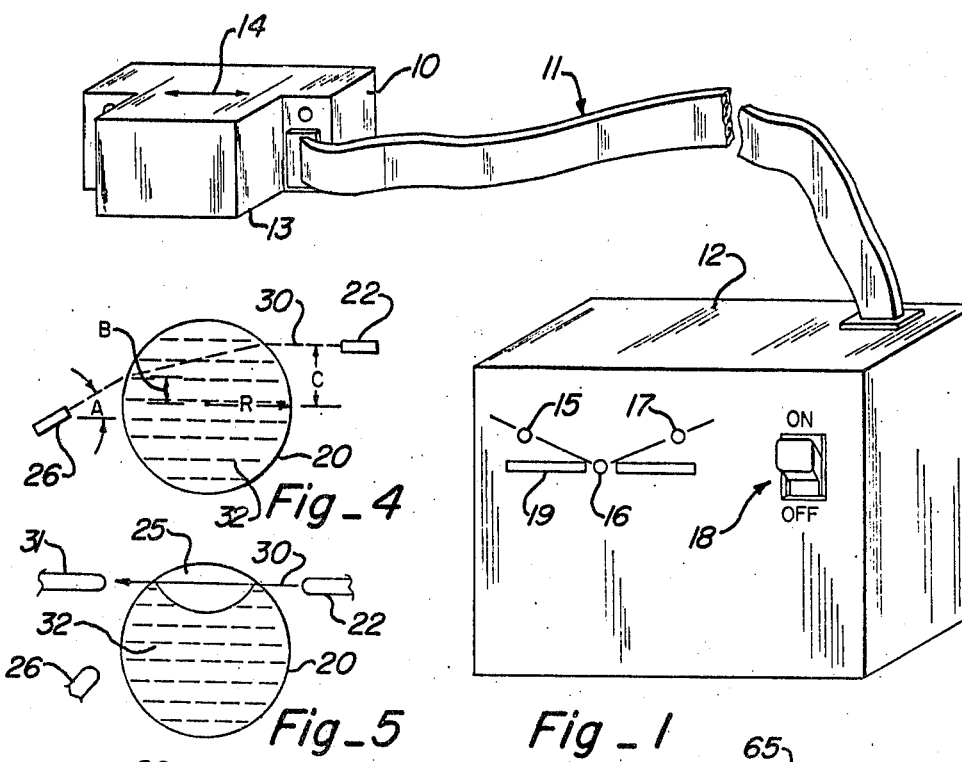
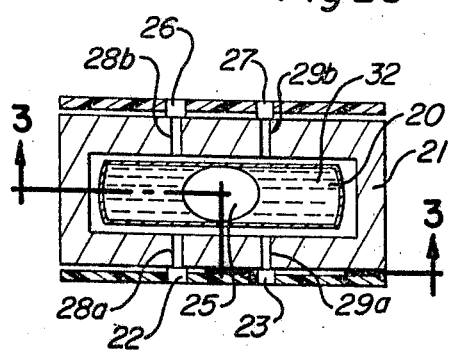
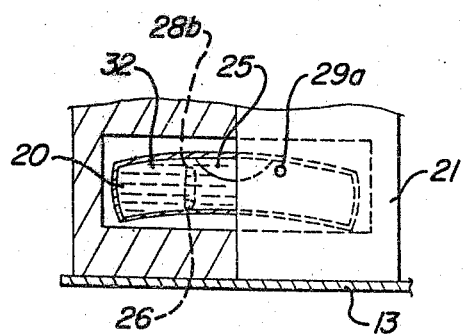
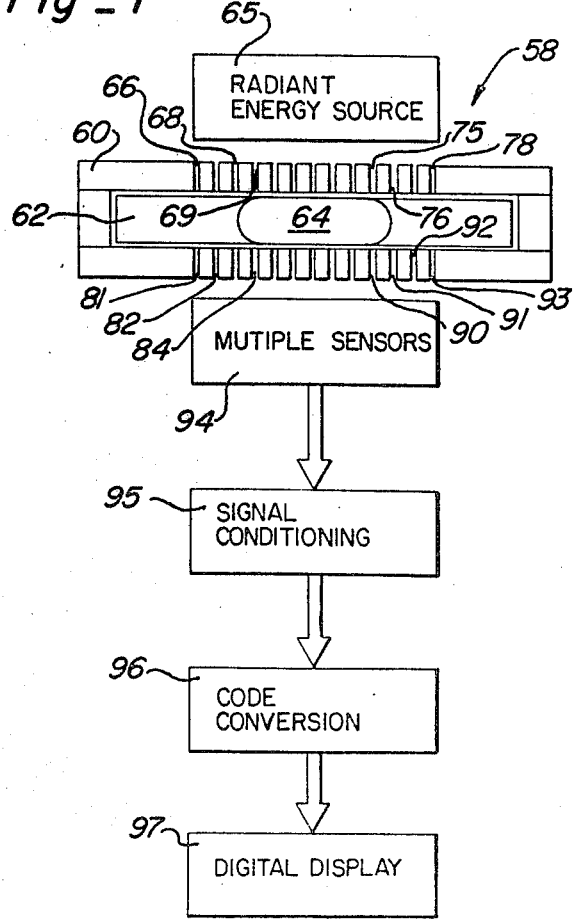

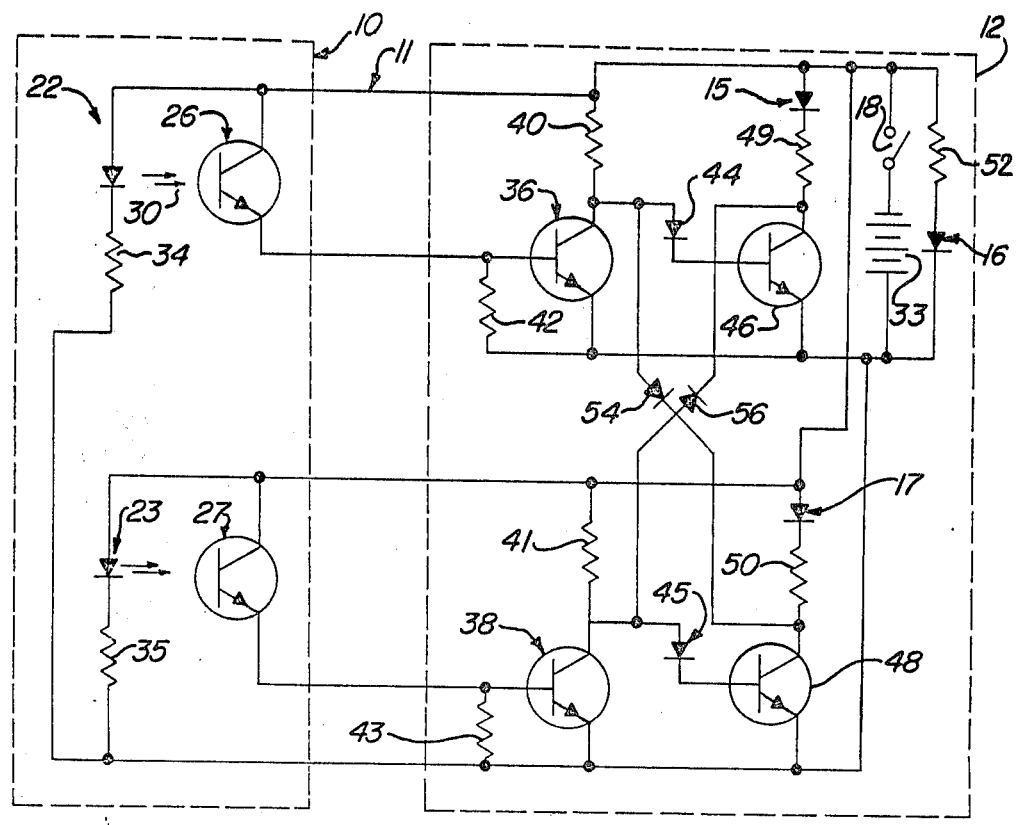
Fig_6
PRIORITY ENCODER
FUNCTION TABLE
| INPUTS | | | | | | | | | OUTPUTS (B.C.D.) | | | | DECIMAL EQUIVALENT |
|---|---|---|---|---|---|---|---|---|---|---|---|---|---|
| 1 | 2 | 3 | 4 | 5 | 6 | 7 | 8 | 9 | D | C | B | A | |
| X | X | X | X | X | X | X | X | L | L | H | H | L | 9 |
| X | X | X | X | X | X | X | L | H | L | H | H | H | 8 |
| X | X | X | X | X | X | L | H | H | H | L | L | L | 7 |
| X | X | X | X | X | L | H | H | H | H | L | L | H | 6 |
| X | X | X | X | L | H | H | H | H | H | L | H | L | 5 |
| X | X | X | L | H | H | H | H | H | H | L | H | H | 4 |
| X | X | L | H | H | H | H | H | H | H | H | L | L | 3 |
| X | L | H | H | H | H | H | H | H | H | H | L | H | 2 |
| L | H | H | H | H | H | H | H | H | H | H | H | L | 1 |
| H | H | H | H | H | H | H | H | H | H | H | H | H | 0 |
Fig_9

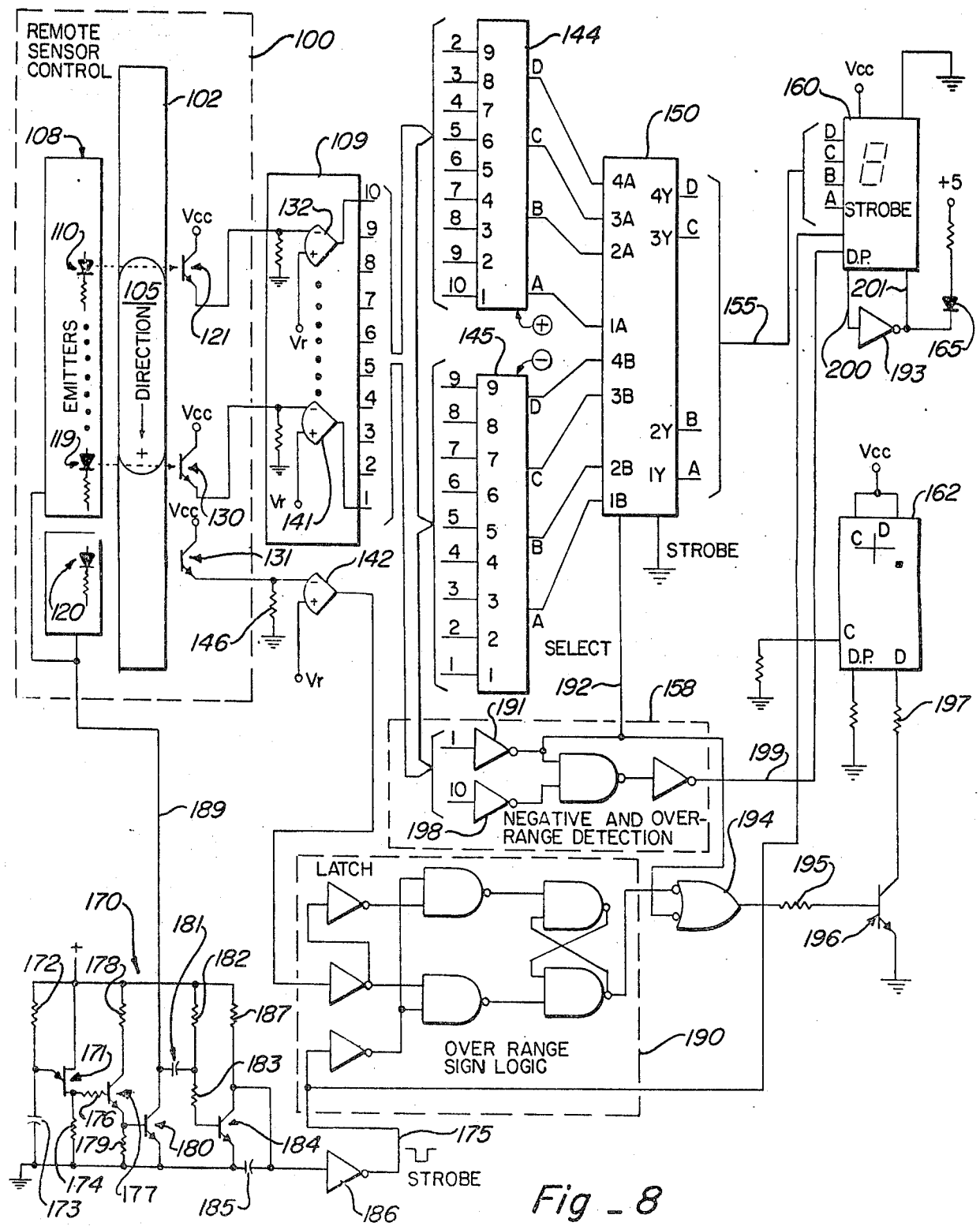
Fig_8

REMOTE LEVEL SENSING INSTRUMENT

This application is a continuation application of parent application Ser. No. 648,383, filed with the Patent Office on Jan. 12, 1976, now abandoned.

BACKGROUND OF THE INVENTION

The present invention relates to apparatus and methods for remotely indicating the horizontal status of a plane. More particularly, the present invention relates to apparatus and methods for interpreting light patterns passing through a spirit level at a remote location so as to provide level status reflecting signals at a local control location. The present invention is particularly useful wherever the level status of an inaccessible plane is to be determined or wherever controls for horizontally positioning a plane are inconveniently located relative to the plane being moved.

The need for a remote indicator of the level status of a structure is frequently encountered. For instance, the level orientation of trailers or mobile homes when being parked or leveled is one such occasion. An arrangement for indicating the level status of a house trailer by means of quadrant oriented mercury contact switches is suggested in U.S. Pat. No. 3,657,695 by Birmingham. Another approach to the house trailer level indicating problem is the floating contact point detector of U.S. Pat. No. 3,660,840 by Plofchan. However the use of pendulus type mechanical devices particularly with direct electrical contact for level indicators is generally undesirable since the performance of such devices tends to degrade over long periods of usage.

It is has been well established over the years that a spirit level comprised of an arcuately formed transparent vial or closed tube filled with fluid except for a bubble therein is particularly advantageous for indicating the level orientation of a plane. Circumstances frequently render it difficult if not impossible to directly observe such spirit levels. By way of example, the level status of a trailer bed frequently cannot be easily visualized from the apparatus associated with leveling of the vehicle bed such as jack mechanisms and the like. Further, the level status of beams in building structures, submerged structures, mines and similar environments likewise renders direct observation difficult if not impossible.

It has also been recognized for some time that the light transmission, reflection or refraction characteristics associated with a fluid filled spirit level can be used to advantage in detecting the level orientation of a plane or line in that plane. An elongated light source positioned to illuminate the axial length of a spirit level with the vial positioned between this light source and photodetector devices is shown in U.S. Pat. No. 2,427,902 by Clifton et al. A similar level detecting approach using the light source and photocells oriented in a vertical plane through the axis of the vial is shown in U.S. Pat. No. 3,324,564 by Wright et al. Yet another arrangement for level indicating using the vertical plane orientation of a pair of spaced light sources and photocell detectors which control a motor drive associated circuit for automatic releveling of the spirit level is shown in U.S. Pat. No. 2,252,727 by Pepper. Pepper likewise suggests using electrically conductive fluid in the vial and embedding electrodes through the wall of the vial for actuating indicator lamps to reflect the direction of out-of-level being detected. The use of electrical contacts extending through the spirit level into the interior thereof as suggested by Pepper and others is generally undesirable since this tends to impede accurate bubble movement and requires electrically conductive fluid in the level. Further, long term reliable operation of such devices is difficult to achieve and special fabrication techniques are required.

Light beams focused through lens arrangements into a spirit level so that the light is deflected away from detectors on either end of the bubble when the structure is level is shown in Busick et al U.S. Pat. No. 2,268,017. The Busick et al system allows the unfocused light to pass through the bubble when off level to energize one of the detectors so as to enable an automatic releveling hydraulic mechanism to correct this out-of-level condition. An arrangement wherein a photocell detector is energized from light passing horizontally through the bubble or reflected from the edge of the bubble from light introduced to the end of the vial is shown in Gooley U.S. Pat. No. 3,863,067 and a similar arrangement for detecting light reflected from the meniscus end of the bubble is shown in U.S. Pat. No. 3,371,424 by Sweet. Gooley further suggests using a switching network for actuating a signalling means when the bubble is level but does not suggest indicating the direction of out-of-level or the amount of out-of-level through such switching circuitry.

From the foregoing, it is evident that the prior art devices are dependent upon the electrical conductivity qualities or the light transmission/absorption characteristics of the fluid or the reflective characteristics of the leading and trailing curved portions of the bubble. Although Busick et al relies upon light refraction characteristics of the vial and its fluid contents to deflect light away from the detectors in the absence of bubble intervention in the light path, the system shown requires critically placed focusing lenses, is subject to detection ambiguities in the region of the bubble ends, and is not well suited for use as a portable remote level sensor. Further, prior art devices such as Busick et al do not provide an indication of the direction of out-of-level using a simple three-lamp display nor are they capable of indicating discrete amounts of out-of-level as well as the direction thereof.

Accordingly there has been a continuing need for a portable device suited for use in many environments but capable of producing reliable level indicating output signals at a remote location from the line or plane for which the level condition is to be detected. Additionally, there has been a continuing need for such a device which employs a minimum number of reliable components with an effective output display for a variety of applications. Still further, there has been a continuing need for a level detector which can provide remote signals reflecting the amount and direction that a line or plane is out-of-level.

SUMMARY OF THE INVENTION

This invention is concerned with apparatus and methods for detecting the level orientation of a surface and for generating signals which reflect the level condition for use at a location remote from the surface. Although the sensor as shown and described herein effectively determines the level status of a surface in one direction, it will be readily apparent that the invention can be easily adapted to indicate level status in mutually perpendicular directions so as to provide a total indication of the orientation of a surface. For instance, this can be effected by utilizing pairs of sensors or by including a pair of mutually perpendicular sensors within a common housing.

In accordance with this invention, electrical signals indicative of orientation of a line relative to level by using a light column directed towards a light sensitive device to detect the position of a gravity sensitive element. In one form, the gravity sensitive element is a light refracting means and the light sensitive detector is coupled to refracted light exiting therefrom only when the refracting means is in a predetermined location representative of level. Thus the electrical conductivity state of the light sensitive device provides an indication of whether or not the line being sensed is level. As a preferred implementation of the gravity sensitive element, the invention advantageously utilizes the principle of the spirit level wherein a transparent elongated vial encloses a fluid and a bubble with the vial formed along the length thereof as a segment of an arc. This vial is mounted within a portable housing in proper orientation to a reference line established in association with the surface to be sensed.

The preferred embodiments are shown and described hereinafter as advantageously utilizing arrangements wherein the light sensors detect the presence of light beam columns exiting from the vial after refraction thereof while passing through the vial and its fluid contents. Applicant has discovered that use of the refracted beam for sensor actuation produces an intense output pattern with a better defined transition point reflective of bubble movement than has been available heretofore. That is, in the past devices, the curved ends of the bubble as the bubble begins to intervene in a light beam path has tended to degrade the exiting light beam pattern thereby producing an ill-defined transition and resulting in potential ambiguities in bubble transition detection when unrefracted beams are sensed as in the prior art. Conversely, applicant has found that the refracted beam pattern does not change position or degrade at the transition points but remains well defined and then simply disappears without noticeable deformation of the pattern as the bubble intervenes. Further, this rapid transition from maximum to zero light intensity is realized with significantly small movements of the bubble. The use of the refracted beam detection obtains several substantial advantages over the prior art including the requirement for less beam power, the ability to precisely position sensors and light isolating aperture plates for improved light gathering efficiency, and the ability to produce highly sensitive output signals reflecting notably small bubble movement.

In one form of this invention, a pair of light beam channels are employed, each channel being mounted in the portable housing and including an arrangement for directing a concentrated column of light against one sidewall of the vial and to exit from the opposite sidewall in either of two directions depending upon whether or not the bubble intervenes in the path of either of the light columns. The light columns are directed at the vial in proximity to but slightly spaced from the ends of the bubble when the bubble is centered along its arcuate path of travel within the vial. Each light beam channel includes a light sensitive device which is coupled to receive the light column in one of the exit directions with the light sensitive devices being otherwise isolated from stray light emanating from other directions. By positioning the originating light columns in relation to the bubble ends as mentioned, the electrical conductivity states of the light or photosensitive devices reflects the bubble position. These conductivity states from the photosensitive devices are coupled to separate signal handling circuitry which produces appropriate output signals to indicate orientation of the sensor relative to level.

Accordingly, the output signals produced by the signal handling devices can be used to energize direct visual display lamps. The circuitry can be arranged in a lamp display contained on a console so that one lamp is continuously energized whenever the circuit is powered whereas one of two other lamps are actuated to indicate the direction that an out-of-level condition is being sensed. The circuitry can further include cross-coupling to insure that one and only one of the out-of-level lamp indicators is energized at any given time.

In another form of the invention, three or more light channels are arrayed along the spirit level vial. The plurality of sensors are then coupled into a code conversion circuit which transforms the resulting output signals into a digital representation of the bubble orientation. This digital representation can be then used for a direct display, as the digital input for other signal handling equipment such as, a computer or the like, or any combination of these.

An object of this invention is to provide a novel and improved level sensor which permits local indication of the status of a remote surface level orientation.

A further object of this invention is to provide a novel and improved system for remotely sensing the level status of a surface at least in one direction and to generate signals at a local station reflecting the level condition sensed.

Another object of this invention is to provide a novel and improved arrangement for locally indicating the level status of a remote surface in a manner which requires minimal components which have excellent long term operational reliability.

Yet another object of this invention is to provide a novel and improved system for locally indicating the level status of a remote surface with a simplified and easily interpretable display.

A still further object of this invention is to provide a novel and improved system using a portable and manually positionable sensor which drives interpreting circuitry for indicating the amount and direction of out-of-level status for a remote surface.

The foregoing and other objects, features and advantages of the present invention will be more apparent in view of the following detailed description of exemplary preferred embodiments.

BRIEF DESCRIPTION OF THE DRAWINGS

FIG. 1 is a perspective view of a remote level sensor and a local control and display console in accordance with one embodiment of this invention.

FIG. 2 is a sectioned top view of the light channels associated with a spirit level in the remote sensor of FIG. 1.

FIG. 3 is a side section view of the FIG. 2 structure taken along offset line 3—3.

FIG. 4 is a sectioned view illustrating a preferred light sensor orientation for receiving the light column from a source after passage through the fluid of a spirit level.

FIG. 5 is a sectioned view of a spirit level illustrating light transmission through the bubble thereof.

FIG. 6 is a schematic diagram of the indicator signal developing circuit associated with the embodiment of FIGS. 1-5.

FIG. 7 is a general block diagram of a further embodiment of the present invention for digitally indicating level status detected by a remote sensor.

FIG. 8 is a detailed circuit diagram of an exemplary implementation of this invention along the lines of the FIG. 7 embodiment; and FIG. 9 is a table of exemplary code conversion signal levels in accordance with the circuitry of FIG. 8.

DETAILED DESCRIPTION OF THE PREFERRED EMBODIMENTS

FIG. 1 shows an overall view of a remote level sensor enclosure 10 which is interconnected by a flexible multiconductor cable 11 into a remote control and level indicator box 12. Sensor 10 is intended to be placed on the item for which a level detection is required and the system is energized via on/off switch 18 on remote box 12. In the embodiment shown in FIG. 1, indicator box 12 includes three lamps such as light emitting diodes [LED] as displays 15, 16 and 17. By positioning the lamps relative to a level indicating reference line 19 as illustrated, a simple display of on-level or the direction of out-of-level is provided. That is, lamp 16 is continuously actuated when the device is turned on and either lamp 15 or 17 might be actuated if the item on which sensor box 10 rests is off level in the direction indicated by the sloped lines on the display panel.

A typical application of this device is for permitting remote monitoring of screw jack leveling as for trailers, mobile homes, building structures or the like although the device is useful for a wide variety of possible applications especially as a level detector for inaccessible surfaces. As will be more apparent from the subsequent description, enclosure 10 establishes a reference line parallel to the surface to be sensed such as by flat bottom plate 13. Arrow 14 inscribed on housing 10 aids the user in placing sensor box 10 for the proper direction of level sensing since arrow 14 is effectively in a plane perpendicular to bottom surface 13, this plane being defined by arrow 14 and the central axis of a spirit level as described below. However, other reference line establishing means can be used such as appropriately positioned suspension hooks for use as a line level sensor, etc.

Mounted within the enclosure of sensor 10 is the bubble level 20 shown in section view in FIGS. 2 and 3. Level 20 is a transparent vial enclosing a fluid 32 and bubble 25. Level 20 is formed so that the axial length is effectively a circumferential segment of a large radius arc. Further, level 20 is mounted within a block or housing 21. Housing 21 is attached to the base plate 13 of sensor box 10 so that the axial arc of vial 20 and a reference line on base plate 13 define a hypothetical plane perpendicular to the plane of base 13 and thus to the surface to be sensed. An alignment guide such as arrow 14 can be inscribed on the housing 10 in the aforementioned hypothetical plane and parallel to the central arcuate axis of vial 20 to facilitate aligning the sensor in the direction in which level detection is desired. However, housing 21 is enclosed within sensor box 10 so as to be totally isolated from external light. A pair of light sources 22 and 23, preferably LED's, are arranged so that the light therefrom is directed via elongated apertures 28A and 29A. These concentrated light columns are directed against the side of vial 20 and, after exiting from the other side of vial 20, are directed to photosensitive devices 26 and 27, respectively, via light directing channels or apertures 28B and 29B through mounting block 21.

FIG. 3 is a section view taken along offset section line 3—3 of FIG. 2 and shows the orientation of the elements when the bubble 25 is in a horizontally level condition. Apertures 28A and 29A are arranged so as to be in the arcuate path of travel of bubble 25 within vial 20. As will be better understood from the description of FIG. 4 below, apertures 28A and 29A are preferably located so as to transmit light columns from sources 22 and 23 against the upper portion of vial 20 with output apertures 28B and 29B being aligned with the respective refracted light columns exiting from vial 20 in proximity to each end of bubble 25. Thus detectors 26 and 27 are energized when vial 20 is level.

FIGS. 4 and 5 represent a cross-section of the vial 20 showing light beam column 30 from source 22 as concentrated by apertures 28A and 28B. In FIG. 4, column 30 is shown being refracted in transmission through fluid 32 of vial 20 in proximity to the end of bubble 25 so as to actuate cell 26. The FIG. 4 relationships prevail when the bubble 25 is indicating an on-level condition or any off-level condition wherein bubble 25 does not intervene between source 22 and sensor 26. In the event that the bubble is out-of-level as by the left side of housing 21 in FIG. 3 being higher than the right side, bubble 25 will migrate to the left within vial 20 and light beam column 30 will be scattered or otherwise deflected away from detector 26, the full intervention relation being shown in FIG. 5. It has been found that excellent results can be obtained by positioning source 22 such that the spacing C (note FIG. 4) above an imaginary line through the central arcuate axis of vial 20 is about 0.7 R where R is the radius of vial 20. By this positioning, column 30 is refracted and exits at a point with a spacing B of about 0.3 R above horizontal and at an angle A of about 30°.

Although the refracted light sensing is preferable because of the significant advantages attendant therewith, it will be recognized that implementation of the present invention using unrefracted light column sensing can be acceptable for some purposes. For instance, FIG. 5 illustrates potential usage of an additional photocell 31 positioned so as to be actuated when the light beam 30 passes through bubble 25 without being significantly refracted by the presence of fluid 32 intervening between source 22 and detector 31. Using photocells such as 31 as unrefracted light detectors, apertures 28 and 29 and their sources 22 and 23 can be located so as to be just within the ends of bubble 25. One of these photocells would then not be actuated whenever bubble 25 moved off-center. Further, it should be apparent that combinations of photocells such as 26 and 31 can be used to provide positive indications of on and off level conditions in a somewhat redundant configuration if desired for improved accuracy.

FIG. 6 shows a typical circuit for controlling displays 15-17. Light sources 22 and 23 can be TIL 24 type LEDs which are actuated from a three-volt power source 33 when switch 18 is closed in which case resistors 34 and 35 are 33 ohm dropping resistors. Photocells 26 and 27 are typically TIL 604 devices. These elements along with the spirit level 20 are located within the enclosure 10 and coupled via cables 11 to the control circuitry in the display box 12. Transistors 36 and 38 are amplifiers such as 2N4124 type devices with the collectors thereof coupled through 3.9 k ohm resistors 40 and 41 to the power source. Resistors 42 and 43 are 20 k ohms for completing the base-emitter circuit. With light passing through vial 20 so that light sensing diodes 26 and 27 are conducting, the result is that transistor amplifiers 46 and 48 are both off thus preventing LED displays 15 and 17 from being actuated via coupling diodes 44 and 45. Loss of light coupling between a source 22 or 23 and its associated detector 26 or 27 causes one of the associated transistor amplifiers 36 or 38 to actuate either display 15 or 17. This is effected via collector coupling through diodes 44 and 45 into the base control of semiconductors 46 and 48 which are connected through 62 ohm resistances 49 and 50 in series with LEDs 15 and 17, respectively. Semi-conductors 46 and 48 are typically 2N4124 devices while LED displays 15 and 17 are typically TIL 209 devices as is LED 16. LED 16 is coupled via 62 ohm resistor 52 across power source 33 so as to be continuously energized at all times that on-/off switch 18 is closed.

An additional pair of diodes 54 and 56 are arranged so as to cross-couple amplifiers 36 and 38 into semi-conductors 46 and 48. This cross-coupling arrangement insures that only one of the displays 15 and 17 will be actuated at any given time. That is, actuation of display 17 as by amplifier 38 prevents display LED 15 from being turned on by amplifier 36 in the event that both sensors 26 and 27 become de-energized. The circuit thereby remembers which display is turned on first and prevents the other display from turning on until the initially actuated display has cleared. This memory circuit is especially useful if the device is to be used in an environment wherein the bubble is periodically agitated into a temporary state of smaller bubbles so that both displays 15 and 17 could be on. Diodes 54 and 56 clamp the opposite amplifier and prevent it from actuating the opposite display.

In use, enclosure 10 is placed so that the flat bottom plate 13 thereof is on the surface for which level sensing is desired and alignment arrow 14 pointed in the intended direction of sensing. For instance, level 10 might be placed on the chassis of a trailer which requires leveling or on an overhead beam which is to be leveled via jacks or the like. Control box 12 is then placed where it can be easily observed such as in proximity to the leveling device and energized through closure of switch 18. Indicator lamp 16 will then be energized and, if the surface being sensed is out-of-level, one of lamps 15 or 17 will be actuated. The user then recognizes that the leveling apparatus requires movement in a direction to correct for the out-of-level indication. As the surface is moved, the bubble will eventually center and thus only lamp 16 will be on with lamps 15 and 17 both being off. This device further permits leveling in any other direction if desired by merely moving enclosure 10 and realigning arrow 14 relative to the surface of the object.

FIG. 7 illustrates a general block diagram of a system for providing digital signals that can be used to directly control a display or for transmission to other digital signal handling apparatus or a combination thereof. A bubble level assembly 58 is employed in a manner somewhat similar to that previously described in that an aperture housing 60 contains fluid enclosing vial 62 with a floating bubble 64 contained therein. A radiant energy source 65 is arranged so as to introduce light or infrared rays into thirteen apertures 66-78 arrayed through the sidewall of housing 60 to impinge thirteen light beam columns on one sidewall of vial 62. On the opposite side of housing 60 and in alignment with respective apertures 66-78 are thirteen apertures 81-93. That is, output apertures 81-93 each receives light columns only from respective input apertures 66-78. A plurality of photocells 94 are each arranged so as to detect the presence of light columns from respective ones of output apertures 81-93. Signal conditioning circuit 95 includes appropriate amplifier stages for each of the outputs for the sensors 94 to provide an input to code conversion circuit 96. Note that with the orientation shown, and assuming refracted light column coupling as described above in FIG. 4, light will be detected by output apertures 81-83 and 91-93 but will not be detected by sensors 94 from apertures 84-90. That is, FIG. 7 illustrates the orientation of bubble 64 when the housing 60 is on-level. Accordingly, signal conditioning output 95 produces a series of levels which reflects a character or byte of data representing 1110000000111. This sequence of levels is recognized by code conversion 96 as on-level and thus causes digital display 97 to indicate that there is zero deviation from level. A shift of bubble 64 in either direction causes a shift of the sequence of ONES and ZEROS which the code conversion circuit 96 transforms into an amount of out-of-level condition and the direction thereof.

Radiant energy source 65 can be infrared emitters, incandescent lamp or lamps or any source to which the multiple sensors 94 can respond. The signal conditioning block 95 converts the low level signal from the sensors to signal levels compatible with code conversion circuit 96. Code conversion 96 translates the signal pattern from sensors 94 as a function of bubble position to a code compatible with the display. The display could be digital or analog. Thus, not only is the level position of bubble 64 indicated but positions other than the level position can be discretely displayed. For instance, with proper level vial sensitivity and an appropriate number of sensors 94, the display can be calibrated so as to indicate on-level or deviations of ten-minute intervals from on-level. It is contemplated in the configuration shown that, with the bubble 64 in a maximum out-of-level position as being fully in one end or the other of vial 62, at least one of the extreme outer sensors associated with output apertures 81 and 93 will exhibit an electrical conductivity state different from all the other sensors in response to passage of the associated light column through vial 60 so that code conversion 96 can indicate via digital display 97 that the device is in a maximum out-of-level condition in a particular direction.

However, as soon as bubble 64 has moved sufficiently so that either of the two outer pairs of sensors as associated with apertures 81 and 82 or 92 and 93 are actuated, the code conversion circuit then can recognize that a measurable out-of-level condition exists and display exactly what this condition is. Note that the output of sensors 94, signal conditioning amplifiers 95 or code conversion circuitry 96 can be used as the input for other digital data processing systems such as the input to a so-called sensor based computer system, digital data acquisition device, appropriate control unit, or the like. A code conversion circuit 96 might typically transpose the digital input information thereto for actuating the display input terminals of state-of-the-art or conventional and existing digital displays. Further, the digital display does not require separate buffer storage since the condition of bubble 64 is being continuously detected and displayed.

FIG. 8 is a schematic diagram of a system for detecting and displaying in digital form the attitude of a remote sensor module 100 relative to the level orientation of that module. As an exemplary implementation, the FIG. 8 system will be described as configured to indicate the degree of off-level in increments of 0.1° over a range of plus or minus 0.9°. Level vial 102 required for this range has a sensitivity of 0.1 inches of movement for bubble 105 per 0.1° of rotation for vial 102. The display range and sensitivity is dependent upon the level vial 102 sensitivity. For example, if level vial 102 has a sensitivity of 0.1 inches of bubble 105 movement per 0.1 minutes of vial 102 rotation, the same circuit shown would display a range of plus or minus 0.9 minutes with 0.1 minute increments. Light sources 108 includes 10 discrete light emitting devices such as LEDs 110–119 (only the first and last of which are shown) each of which directs light into a columnating aperture as described previously. Detector box 109 senses the electrical conductivity state of the ten separate light sensitive devices 121–130 each of which receives light exclusively from a respective source 110–119. In addition, a light source 120 and photocell 131 is included for over range sign determination as will be described below. The number of pairs of emitters and sensors can be changed to increase or decrease the number of increments to be displayed. However it will be recognized that the light from each of the source emitters 110–120 is concentrated into a column and the exiting output light beam resulting therefrom is passed to the associated detecting photocell 121–131 by an appropriately positioned aperture again as described hereinbefore. The following description assumes that the refracted light sensing principle discussed previously is implemented in the FIG. 8 circuitry in which case the arrows generally indicating light column coupling from sources 110 and 119 into sensors 121 and 130 merely indicate orientation of these light columns in proximity to the ends of bubble 105 when vial 102 is level. That is, for refracted light implementation, light is not coupled to any of sensors 121–130 with the orientation of bubble 105 as shown in FIG. 8.

Remote sensor module 100 consists of an array of eleven infrared emitters 110–120 which typically can be TIL 24 devices. These emitters are mounted on an aperture plate as mentioned so as to direct the individual infrared beams to the appropriate points on the side of level vial 102. On the opposite side of vial 102, an additional aperture plate appropriately positioned channels the refracted infrared beams to the associated infrared sensors 121–131 which can typically be TIL 604 devices. The aperture plates on each side of vial 102 function to shape the infrared beam and minimize any cross-channel coupling of light. Typical spacing of the 121–130 would be 0.1 inches between centers. The distance between sensor and emitter is dependent upon the diameter of level vial 102.

With a circuit arrangement as shown in FIG. 8 all of the ten displacement sensors 121–130 are off when bubble level 102 is in a level orientation. This is caused by bubble 105 intervening in the refracted light path of the infrared beam columns. The output of the sensors 121–130 is compared with a reference voltage level Vr by comparator circuits 132–141 within level detector circuit 109. As bubble 105 in vial 102 moves, the sensors receive energy that causes the outputs thereof to increase. At a predetermined level, the level detectors 132–141 switch to a low output. That is, the ten outputs from level detectors 132–141 are active when low.

Table I below itemizes examples of level detector 109 outputs as a function of bubble 105 movement. The bubble movement listed is in inches with L meaning a low voltage level output, H meaning a high level output and the source/sensor pairs (eg: 110 and 121 through 119 and 130) being assumed to be placed on 0.1 inch spacing between centers. The level vial sensitivity is assumed at 0.1° per 0.1 inch of bubble movement as mentioned previously.

TABLE I

| Sensor Number | | | | | | | | | | | |
|---|---|---|---|---|---|---|---|---|---|---|---|
| 1 | 2 | 3 | 4 | 5 | 6 | 7 | 8 | 9 | 10 | Degrees | Bubble Movement |
| L | L | L | L | L | L | L | L | L | H | −.9 | −.9 |
| L | L | L | L | L | L | L | L | H | H | −.8 | −.8 |
| L | L | L | L | L | L | L | H | H | H | −.7 | −.7 |
| L | L | L | L | L | L | H | H | H | H | −.6 | −.6 |
| L | L | L | L | L | H | H | H | H | H | −.5 | −.5 |
| L | L | L | L | H | H | H | H | H | H | −.4 | −.4 |
| L | L | L | H | H | H | H | H | H | H | −.3 | −.3 |
| L | L | H | H | H | H | H | H | H | H | −.2 | −.2 |
| L | H | H | H | H | H | H | H | H | H | −.1 | −.1 |
| H | H | H | H | H | H | H | H | H | H | +0 | +0 |
| H | H | H | H | H | H | H | H | H | L | +.1 | +.1 |
| H | H | H | H | H | H | H | H | L | L | +.2 | +.2 |
| H | H | H | H | H | H | H | L | L | L | +.3 | +.3 |
| H | H | H | H | H | H | L | L | L | L | +.4 | +.4 |
| H | H | H | H | H | L | L | L | L | L | +.5 | +.5 |
| H | H | H | H | L | L | L | L | L | L | +.6 | +.6 |
| H | H | H | L | L | L | L | L | L | L | +.7 | +.7 |
| H | H | L | L | L | L | L | L | L | L | +.8 | +.8 |
| H | L | L | L | L | L | L | L | L | L | +.9 | +.9 |

An examination of Table I reveals that within the range of plus and minus 0.9 inches of movement, there is a unique combination of sensor outputs that relate to each position. This coded output can be translated into a code suitable for use with conventional available displays. In the following examples, the desired code for the display is presumed to be binary coded decimal [BCD].

In FIG. 8, the appropriate outputs from level detectors 109 are coupled as shown to a pair of encoder circuits 144 and 145. Encoder circuits 144 and 145 can typically be 74147 type circuits which can accept a ten-line input for conversion into a four-line priority encoded output in BCD format. The nine numbered inputs for encoders 144 and 145 are merely equivalent input numbers and do not reflect actual pin connections for the 74147 module. The comparator circuits 132–142 are typically each one-fourth of an LM 339 circuit module with the input resistances such as resistance 146 being 20 K ohms.

In FIG. 9, the inputs designated H indicate a high logic level, L indicates a low logic level and X indicates irrelevant state. The four outputs indicated as A–D are in BCD code. Examination of Table I above and FIG. 9 reveals that with two encoders 144 and 145, both the plus and minus movement code shown in Table I can be translated to BCD by selecting the proper encoder for the plus and minus functions. With the connection shown, encoder 144 translates positive movement code to BCD whereas encoder 145 translates negative movement code to BCD.

The two outputs from encoders 144 and 145 are applied to data selector circuits 150 which can be a standard 74158 circuit module. Data selector circuit 150 channels the positive or negative BCD to its output 155. Selection is made by the negative and overrange detection logic 158. It should be understood that the BCD codes at the output 155 of data selector 150 does not carry any sign information; it is the magnitude of the reading only which is being presented. This is applied to display element 160 which is typically a TIL 309 module. With proper control inputs, the display module 160 accepts the BCD code and displays the corresponding decimal digit.

The sign of the reading is displayed by module 162 which is typically a TIL 304 module. The decimal point is fixed in this case and is displayed by module 162 concurrently with the sign indicator. The sign displayed by module 162 is selected by the negative and overrange detection logic 158 for the displayed range of operation. In the event that all ten sensors are on, the overrange sign logic 190 determines the sign to be displayed to reflect the direction of the out-of-range condition. This arrangement causes the sign displayed by module 162 to be correct even with an overrange condition.

Negative and overrange detection logic 158 continuously inspects the first and tenth sensor condition and, when both are active, the bubble 105 is beyond the range of accurate detection of the ten sensors or in an overrange condition. At this time, the display 160 is blanked off as described later and an overrange indicator light 165 is turned on. Indicator 165 is typically a TIL 209 type LED coupled via a 160 ohm resistor to Vcc which is typically a regulated positive five volt power source. Display module 162 continues to exhibit the correct sign indication for the direction of the overrange condition. This is accomplished by the eleventh sensor 131 which is offset from the other ten sensors 121–130 so as to be normally receiving refracted light when bubble 105 is in any position except positive out-of-range. The condition of this sensor 131 determines the sign of the overrange condition.

To decrease the average power dissipation of the infrared emitters 108, they are enabled or turned on for a short period of time such as about 0.2 milliseconds and remain off for a relatively long period of time such as about 20 milliseconds. This requires that the data be sampled during this on-time and stored and displayed during the off time although it is also displayed during the on-time. The display module 160 as a TIL 309 module includes memory latches within its internal structure. Circuit 170 includes a clock, emitter drive and strobe generator circuit to provide the signals required to drive emitters 108 periodically and to provide a strobe pulse at output 175 which gates the data into the storage latches of the display module 160 and the overrange sign logic 190 at the correct time. The strobe pulse is delayed from the leading edge of the emitter drive pulse to allow the signal levels to stabilize before they are sampled and gated into the storage latches of display 160.

The system described can be implemented with outer standard MSI devices now available. They could also be implemented using discrete logic although an increase in size would be required. It should be clear that the concept can be expanded or contracted to control the number of increments to be displayed and that the level vial sensitivity can be selected to give whatever degree of accuracy is desired.

Circuit 170 includes an RC oscillator composed of semi-conductor 171 which might typically be a 2N4871FET. Resistor 172 is 33 K ohms and capacitor 173 is a one microfarad capacitor which, in conjunction with 220 ohm resistor 174, provides a relaxation oscillator clock circuit. This output is coupled through a 47 ohm resistor 176 into a 2N4124 semi-conductor 177 which is coupled to the power source at the collector by a 62 ohm resistor 178 and to ground by 1 K ohm resistor 179 and further drives a 2N5190 semi-conductor 180 which has the collector thereof coupled through emitter energizing line 189 to the emitters in module 100.

The emitter drive 180 is coupled through a 0.033 microfarad capacitor 181 into a divider network composed of a 20 K ohm resistor 182 and a 1 K ohm resistor 183 for driving a 2N4124 transistor 184. The collector of transistor 184 is coupled to the power source via 20 K ohm resistor 187 and likewise is coupled through an inverter circuit 186 to produce the output strobe 175 with the delay from the circuit being sufficient to insure that all emitters and sensors in module 100 are fully activated before the output is sampled. A 0.1 microfarad capacitor 185 insures this time delay for the sampling the strobe output 175.

Preferably the overrange detector controlled by emitter 120 and photosensitive device 131 is placed so that it will always be activated except when the bubble 105 is in the extreme positive position so that bubble 105 is beyond sensing of the last position sensor 130. The comparison of the level of sensor 131 in comparator 142 provides the input for overrange sign logic 190. The negative and overrange detection logic 158 inspects the status of the first and tenth sensors as represented by the outputs of comparators 132 and 141. Thus, the output of the first sensor as produced by comparator 141 is coupled into inverter circuit 191. If the output of inverter circuit 191 is high from an active or low output of comparator 141, a signal level is produced on select input 192 for data selector 150 to effect the coupling of the B or negative input to output 155 for display 160. This results from refracted light being coupled from source 119 into sensor 130. Conversely, the absence of such light coupling produces a low level on line 192 to effect selection of the A or positive inputs for such coupling via selector 150. In addition, the level of the output of circuit 191 is coupled to an OR circuit 194 in conjunction with the overrange detection 190 output. The output of OR circuit 194 is coupled through a 3 K ohm resistor 195 into a 2N4124 transistor 196. By coupling the collector of transistor 196 through an 82 ohm resistor 197 into the D input for a TIL 304 module as display 162, the appropriate display sign will be presented whether or not an overrange condition exists.

Note that when vial 102 is level, none of sensors 121–130 will be actuated. In this circumstance, the output of comparator 141 and accordingly the input for the first sensor to circuit 191 will be high thereby producing a low level on line 192. Accordingly, the A portion of the input to selector circuit 150 will be selected for coupling to output 155 but the BCD output of encoder 144 thus coupled will indicate that ZERO is present as can be seen from Table I and FIG. 9. However, as will be understood from the following discussion, an output will be produced from OR 194 so that a positive sign will be generated even though it is of no significance in view of the zero displayed by 160.

Using conventional modules such as those previously mentioned, displays 160 and 162 include memory circuits which are effectively latched or non-latched depending upon the input. Thus for display 162, grounding of the C input through an 82 ohm resistor will insure that the horizontal display bars are continuously activated. Similarly, the decimal point DP input of display 162 is grounded through a 160 ohm resistor so that the decimal point is continuously displayed. The vertical crossbar display depends upon the state of the D input which is controlled by semi-conductor 196. Overrange sign logic 190 is coupled as a conventional latch circuit as shown with the state of the overrange output from comparator 142 being sampled by the strobe input 175. By use of OR 194, the absence of light coupling into either the first sensor 130 or the out-of-range sensor 131 will result in no enabling of semi-conductor 196 so that the D input is not present and only the negative sign produced. Conversely, the absence of light coupling in either the first sensor 130 or the out-of-range sensor 131 will result in the OR inputs for circuit 194 being satisfied so that semi-conductor 196 is conducting and the D input present for display 162. Note that the use of the first sensor for encoder 144 or the tenth sensor for encoder 145 is not necessary since the presence of either of those signal levels are monitored by the negative and overrange detection circuit 158 to control the display of valid data or an indication of out-of-range.

When an out-of-range condition exists, the outputs of inverters 191 and 198 are effectively ANDed to produce output 199. For convenience, the output 199 of detection circuit 158 is coupled to the decimal point DP input to display 160 so as to set the DP memory latch in module 160. The set state of this latch is produced as the DP output on line 200 into inverter 193 which then reintroduces the blank signal on input line 201 of module 160 to prevent any data from being presented on display 160. Concurrently, the output of inverter 193 energizes the overrange display indicator LED 165. As mentioned, display 162 is providing an indication of the positive or negative direction of the out-of-range status at the same time that display 160 is blanked and lamp 165 energized. An overrange condition if effectively detected at all times that bubble 105 has moved in either direction so that refracted light is being concurrently coupled into both sensors 121 and 130 thereby preventing accurate translation of the position of bubble 105 by the circuitry.

Although the present invention has been described in detail relative to the foregoing exemplary preferred embodiments, additions, modifications and applications other than those specifically mentioned herein will be readily apparent to those having normal skill in the art without departing from the spirit of this invention.

What is claimed is:

1. Apparatus for sensing orientation of a remote surface with respect to level comprising:
    an elongated transparent vial enclosing a fluid and a bubble, said vial being formed along the length thereof as a segment of an arc,
    a portable housing means for establishing a reference line parallel to the surface to be sensed, said housing further including means mounting said vial therein with the elongated axis of said vial and said reference line defining a plane perpendicular to the surface to be sensed, said mounting means positioning said vial with the central portion of said arc higher than the ends of said vial when vial is level,
    a plurality of light beam channels within said housing and each including means for directing a concentrated column of light against one sidewall of said vial so that said light column will pass through the vial and said fluid and will exit from the sidewall of said vial at a second point along an arc defined by the cross-section of said vial, each said column of light exiting in a first direction after passing through said bubble and in a second direction after passing through said fluid, said light beam channels being arcuately arranged along said vial and spanning a distance greater than the length of said bubble, two of said light beam channels of said plurality being directed towards said one sidewall in proximity to but spaced from respective ends of said bubble when said vial is level, said plurality of light beam channels each further including a light sensitive device responsive to a light column from one of said exit directions while being isolated from light emanating from any other direction so that the electrical conductivity state of each said light sensitive device reflects the position of said bubble within the said vial,
    circuit means responsive to the electrical conductivity states of said light sensitive devices for generating first and second output signals representing the direction and magnitude of displacement of said vial relative to the level attitude of said reference line, and
    overrange detector means responsive to the electrical conductivity states of said light sensitive devices associated with said two of said light beam channels for generating an output signal when said bubble is out of the detectable range of the other of said plurality of light beam channels.

2. Apparatus in accordance with claim 1 wherein said light beam channels are arranged for directing said light columns against said one sidewall so that said light columns are refracted in passing through said fluid in proximity to opposite ends of said bubble when said vial is horizontally level, said light sensitive devices each including an aperture aligned with the direction of refracted light exiting from said vial from respective ends of said bubble when said vial is level.

3. Apparatus in accordance with claim 1 which further includes a display having a first and second lamp devices connected for actuation in response to respective said first and second output signals for producing a visible output indication of the direction the surface is out of level.

4. Apparatus in accordance with claim 3 which includes an electrical power source, switch means for selectably coupling said power source to said circuit means, and a third lamp device energized whenever said power source is coupled to said circuit means by said switch means.

5. Apparatus in accordance with claim 4 wherein said display includes a panel mounting said first and second lamp devices above and on opposite sides of said third lamp device in a generally V-shaped configuration.

6. Apparatus in accordance with claim 1 wherein said circuit means includes means continuously operable during the presence of one of said output signals for preventing generation of the other said output signal.

7. Apparatus in accordance with claim 1 wherein said plurality of light beam channels are arrayed with equal spacing therebetween along said vial and at least one said channel is located so as to be interposed by said bubble whenever said vial is level, whereby the electrical conductivity state of said light sensitive devices defines a multiple bit digital character representative of the orientation of the surface relative to level in the given direction.

8. Apparatus in accordance with claim 7 which further includes indicator means responsive to digital input signals for producing a visible display corresponding thereto, and means for converting said electrical conductivity states into digital signals for said indicator means to produce a display reflecting the orientation of the surface relative to level in the given direction.

9. Apparatus in accordance with claim 1 wherein said overrange detector means includes a logic circuit means whereby the state of one of said two of said light beam channels and the state of one of the other of said plurality of light beam channels is operative to generate a sign signal representative of the direction of said bubble along said vial.

10. A system for providing a remote indication of the orientation of a surface relative to level in a given direction comprising:

means retaining a light modifying element for movement along a predetermined path with said element continuously assuming a position reflecting level, housing means including means engageable with the surface to be measured for establishing a reference line, said housing means further having means for mounting said element so that said predetermined path in conjunction with said reference line defines a plane perpendicular to the surface to be measured, said element being located in an intermediate position along said predetermined path when the surface is level, at least one light source, a first opaque plate positioned parallel to said plane and having a pair of apertures and a plurality of additional apertures opening therethrough with each said aperture forming light from said source into a column perpendicular to said plane in a location so that said light column crosses said predetermined path of said element, said apertures of said pair being positioned for directing said light columns therefrom in locations in proximity to respective ends of said element along said predetermined path when said element is in said intermediate position, a second opaque plate positioned parallel to said plane and on the side thereof opposite said first plate and having a pair of apertures and a plurality of additional apertures therethrough in alignment with respective said light columns exiting from said plane, a plurality of light sensitive devices aligned with said pair of apertures and plurality of additional apertures in said second opaque plate each capable of changing electrical conductivity state in response to light impinging thereon from a light column passing through an aperture aligned with each respective light sensitive device, circuit means responsive to the electrical conductivity states of said plurality of said light sensitive devices for said plurality of additional apertures for producing a digital output signal representing the location of said element along said predetermined path so as to indicate the orientation of said reference line relative to level, and overrange circuit means associated with said light sensitive devices for said pair of said apertures in said first and second opaque plates for generating an output signal to indicate that said element is out of the detectable range of said plurality of additional apertures and associated light sensitive devices.

11. A system in accordance with claim 10 wherein said circuit means includes means for converting said digital output signal to a signal indicating the amount and direction said light modifying element is displaced along said predetermined path from said intermediate position.

12. A system in accordance with claim 10 which further includes means for transforming a digital character at the input thereof into a corresponding visually readable display, said circuit means further including means for transposing said digital output signal into a digital character for said display means input for causing said display means to register a visually readable output reflecting the orientation of the surface relative to level in the direction of said reference line, said output signal of said overrange circuit means causing said display means to indicate that said element is out of the detectable range.

13. A system in accordance with claim 12 wherein said overrange circuit means includes means responsive to the electrical conductivity state of said additional light sensitive device for causing said display means to indicate the direction said element is out of the detectable range.

* * * * *

UNITED STATES PATENT AND TRADEMARK OFFICE
CERTIFICATE OF CORRECTION

PATENT NO. : 4,154,000
DATED : May 15, 1979
INVENTOR(S) : Melvin G. Kramer

It is certified that error appears in the above—identified patent and that said Letters Patent is hereby corrected as shown below:

In the Specification:

Column 11, line 57, cancel "outer" and substitute -- other --.
Column 12, line 21, before "the" add -- of --.
Column 13, line 38, cancel "if" and substitute -- is --.

In the Claims:

Claim 1, Column 13, line 63, after "when" add -- said --.

Signed and Sealed this

Fifteenth Day of April 1980

[SEAL]

Attest:

SIDNEY A. DIAMOND

Attesting Officer — Commissioner of Patents and Trademarks